(12) United States Patent
Yang et al.

(10) Patent No.: US 7,746,028 B1
(45) Date of Patent: Jun. 29, 2010

(54) HEADSET CHARGING CRADLE

(75) Inventors: Joseph W. Yang, San Jose, CA (US); Joseph P. Watson, San Jose, CA (US)

(73) Assignee: Plantronics, Inc., Santa Cruz, CA (US)

( * ) Notice: Subject to any disclaimer, the term of this patent is extended or adjusted under 35 U.S.C. 154(b) by 1059 days.

(21) Appl. No.: 11/388,721

(22) Filed: Mar. 24, 2006

(51) Int. Cl.
*H02J 7/00* (2006.01)

(52) U.S. Cl. .................. 320/107; 320/114; 320/115

(58) Field of Classification Search .......... 320/107, 320/110, 111, 112, 113, 114–115
See application file for complete search history.

(56) References Cited

U.S. PATENT DOCUMENTS 6,923,688 B1   8/2005  Burson et al.
7,019,492 B1*  3/2006  Baker et al. .............. 320/114
2003/0207603 A1* 11/2003  Potega .................... 439/218
2006/0147078 A1*  7/2006  Neu et al. ................ 381/374
2006/0258412 A1* 11/2006  Liu ...................... 455/575.2

FOREIGN PATENT DOCUMENTS

EP   1548911 A1 *  6/2005

OTHER PUBLICATIONS

Webster's II NewRiverside University Dictionary, 1984, The Riverside Publishing company, p. 704.*
U.S. Appl. No. 10/622,037, filed Jul. 16, 2003, Blum.

* cited by examiner

*Primary Examiner*—Patrick J Assouad
*Assistant Examiner*—Samuel Berhanu
(74) *Attorney, Agent, or Firm*—Intellectual Property Law Office of Thomas Chuang

(57) ABSTRACT

Systems and methods for a headset charging cradle are disclosed. The system generally includes a loop for receiving a headset earbud and a cradle charging interface disposed below the loop for coupling with a headset charging interface.

20 Claims, 13 Drawing Sheets

HEADSET CHARGING CRADLE

BACKGROUND OF THE INVENTION

Wireless headsets are battery powered such that a user can use the wireless headset or other such device without being directly connected to larger power source such as an A/C outlet or automobile battery. This allows wireless headset users flexibility and convenience to move about without being tied to a power cord. Wireless headset batteries are generally rechargeable so that the batteries can be re-used instead of being discarded after use.

Typically, a wireless headset or mobile phone includes an electrical interface such as a mating connector to transfer charging current to the battery so that charging current power can be supplied without removing the batteries from the device. In a mobile environment, such as an automobile, recharging is generally performed using a low-voltage cable connector from the cigarette lighter or other interface to the automobile battery which is plugged directly into the headset's mating connector. The cable connected to the battery supplies charging current through the coupled contacts to recharge the batteries located within the headset. The headset connected to the cable must then be placed somewhere within the automobile, such as a cup holder, the passenger seat, or other location.

However, the use of a cable connector with a headset in an automobile or other mobile environment poses several problems. Plugging the cable connector into the headset may be somewhat difficult as the charging interfaces (also referred to herein as electrical interfaces) for the cable and the headset must be aligned. Two hands are typically required to plug the cable into the headset, and visual alignment is required. Upon completion of charging, two hands are required to disconnect the cable and headset. If the user is driving the automobile, this requirement naturally poses hazards. Furthermore, the headset may be exposed to contaminants or damaged when placed randomly in the passenger compartment.

In home use, charging cradles have been used to recharge headsets and mobile phones. Charging cradles may also be referred to in the art and herein as docking stations, charging bases, or charging stations. In a typical setup, the headset is inserted into a charging station which has wiping contacts that correspond to and couple with the wiping contacts on the headset. However, as headsets become lighter, the weight of the headset maybe insufficient to provide adequate electrical contact between the headset charging contact and the cradle charging contacts when the headset is placed in the cradle. Furthermore, in a mobile environment such as an automobile, the use of a cradle may be subject to vibrations and jarring and there are limitations on placement of the cradle. If the headset is not firmly detented in the cradle, it may be dislodged from the cradle or the electrical connection may be lost.

As a result, for these and other reasons, there is a need for improved methods and apparatuses for charging wireless headsets.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Methods and apparatuses for a headset charging cradle are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

Generally, this description describes a charging cradle for receiving a headset which easily slides into and is easily removed from the charging cradle. The charging cradle enables the coupling of the headset charging contacts with corresponding charging cradle contacts without relying upon gravity to ensure adequate contact pressure. In addition, the headset is firmly locked within the charging cradle to avoid displacement of the headset from the charging cradle due to vibrations or jarring. The headset may be detented within the cradle for charging using only one hand. Furthermore, the charging cradle utilizes an open design such that a variety of headset shapes may be accommodated along with a variety of earhook attachments. The charging cradle provides for self-alignment of the headset charging interface with the charging cradle interface upon insertion of the headset earbud such that the user can insert the headset into the cradle and firmly detent the headset with one hand.

While the present invention is not necessarily limited to headsets, various aspects of the invention may be appreciated through a discussion of various examples using this context.

According to an example of the present invention, a charging cradle includes a rear wall having an upper portion and a lower portion. A loop is disposed at the upper portion extending away from the rear wall for receiving a headset earbud. A first sidewall and a second sidewall are at the lower portion extending away from the rear wall for receiving a headset body. A cradle charging interface is disposed between the first sidewall and the second sidewall for coupling with a headset charging interface.

According to a further example of the invention, a charging cradle includes an upper portion having a loop extending away from a rear wall. A lower portion of the charging cradle has a charging interface for coupling to a headset charging interface. The lower portion is shaped to extend the cradle charging interface to a position below the loop.

Figure 1:
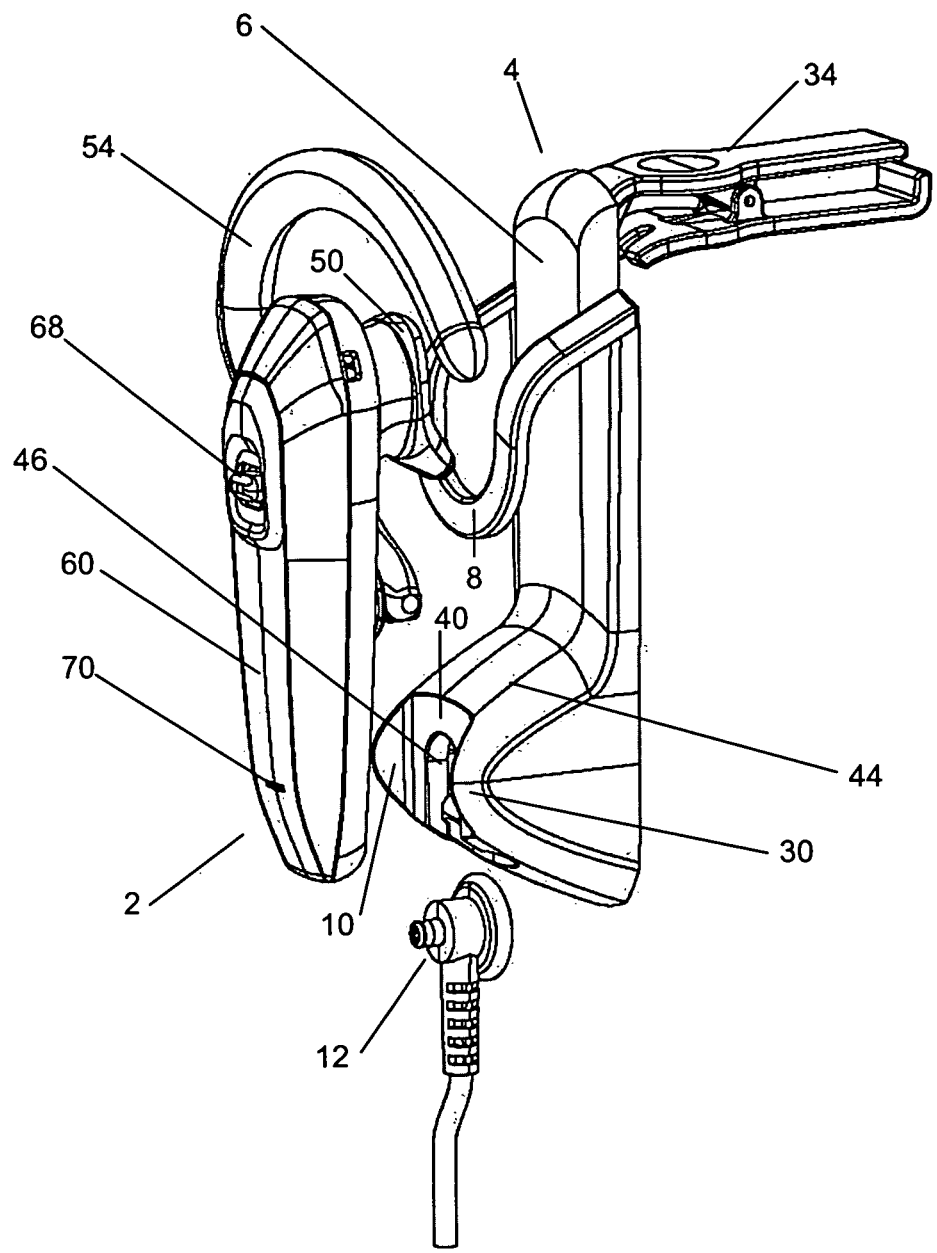
FIG. 1 illustrates a perspective view of a headset, charging cradle, and charging cradle interface.

Referring to FIG. 1, a charging cradle 4 in an example of the invention is illustrated with a cradle charging interface 12. Also illustrated is an example of a headset 2 which may be stored in charging cradle 4.

Figure 2:
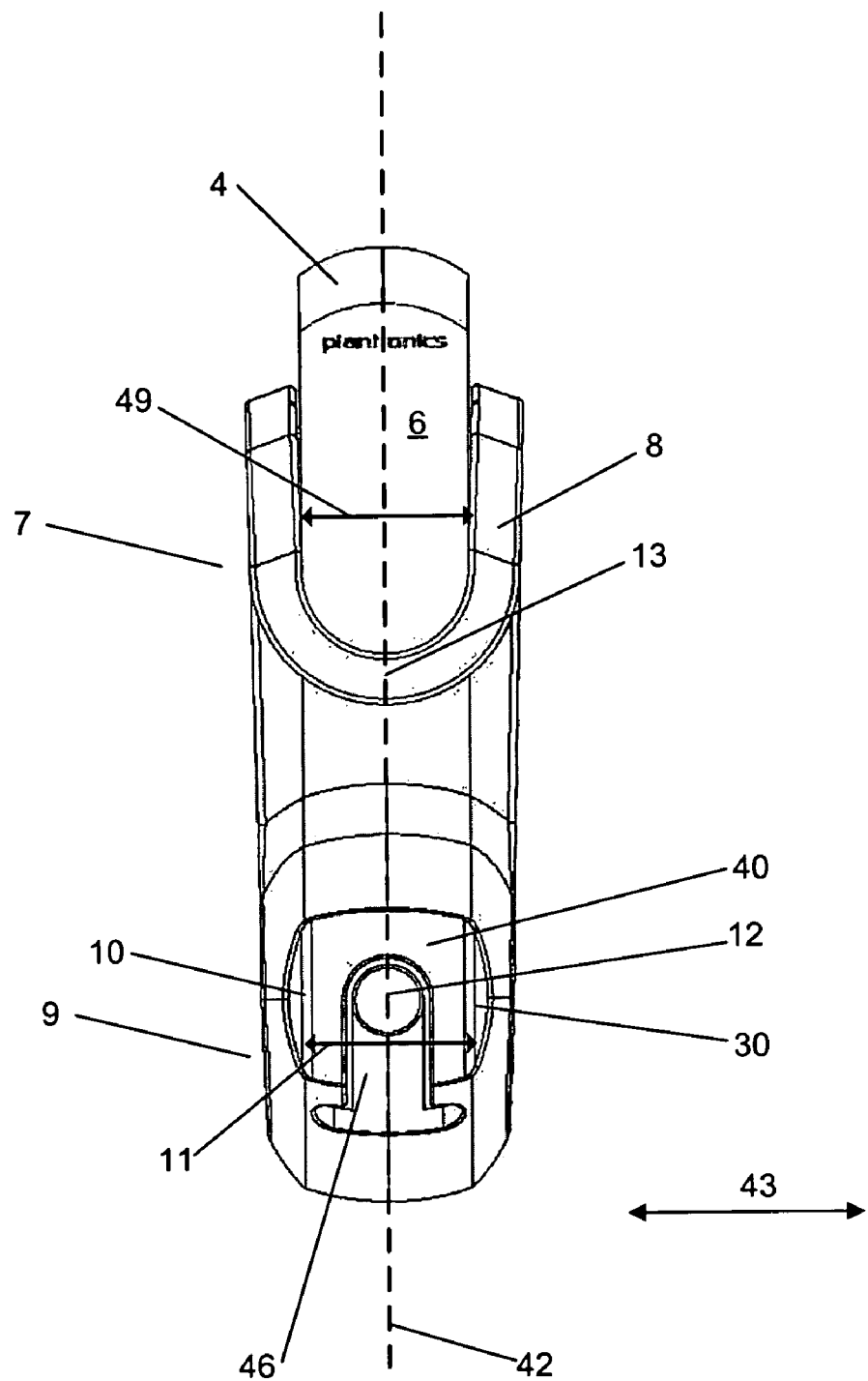
FIG. 2 illustrates a front view of charging cradle in one example of the invention.
Figure 3:
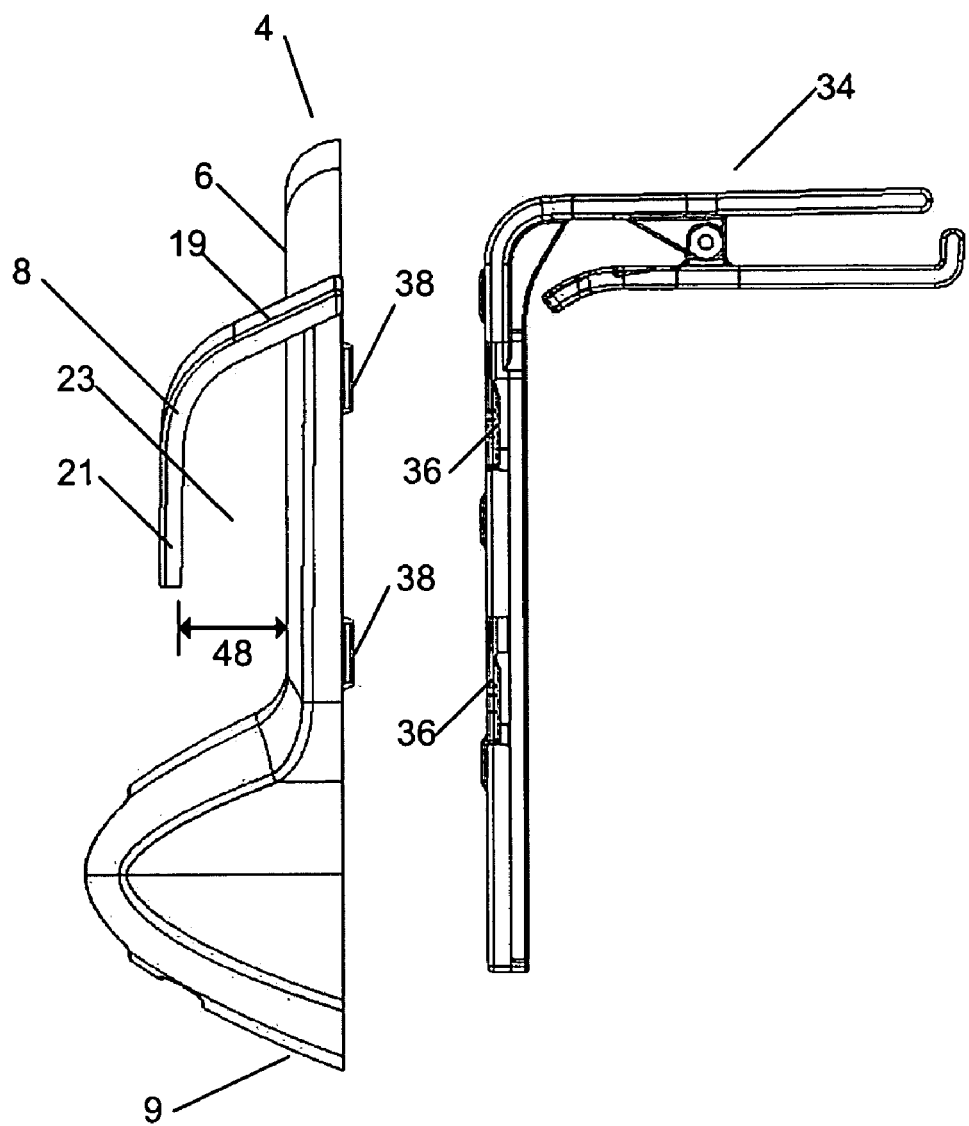
FIG. 3 illustrates a side view of a charging cradle and clip attachment.

FIG. 2 illustrates a front view of charging cradle 4 and FIG. 3 illustrates a side view of a charging cradle 4 and attachment clip 34. The charging cradle 4 will be described in reference to FIGS. 1-3. As will be described in more detail, the novel structure of charging cradle 4 enables the headset 2 to be placed into charging cradle 4 in a rest position and a charging position, allowing the shape of the charging cradle components to guide the headset into its proper location for firm detent of the headset charging interface and the cradle charging interface.

The charging cradle preferably includes a planar rear wall 6 having an upper portion 7 and a lower portion 9. A loop 8 is disposed at the upper portion 7 and extends away from the rear wall 6. The charging cradle may, for example, be formed from a plastic material. In operation, loop 8 receives a headset earbud to store the headset in a rest position. A sidewall 10 and parallel sidewall 30 are located at the lower portion 9 extending away from rear wall 6. Sidewall 10 and sidewall 30 define a volume of space with width 11. In operation, width 11 matches the width of the headset being inserted between sidewall 10 and sidewall 30. In operation, sidewall 10 and sidewall 30 along with loop 8 serve to guide and align the headset charging interface to a position along an axis 42 where the user may easily detent it with the cradle charging interface to place the headset in the charging position from the rest position. Referring to FIG. 2, the center of loop 8 and the cradle charging interface 12 are aligned along axis 42. When an inserted headset is in the rest position, sidewall 10 and sidewall 30 serve to prevent movement of the headset along a lateral direction 43.

Figure 6:
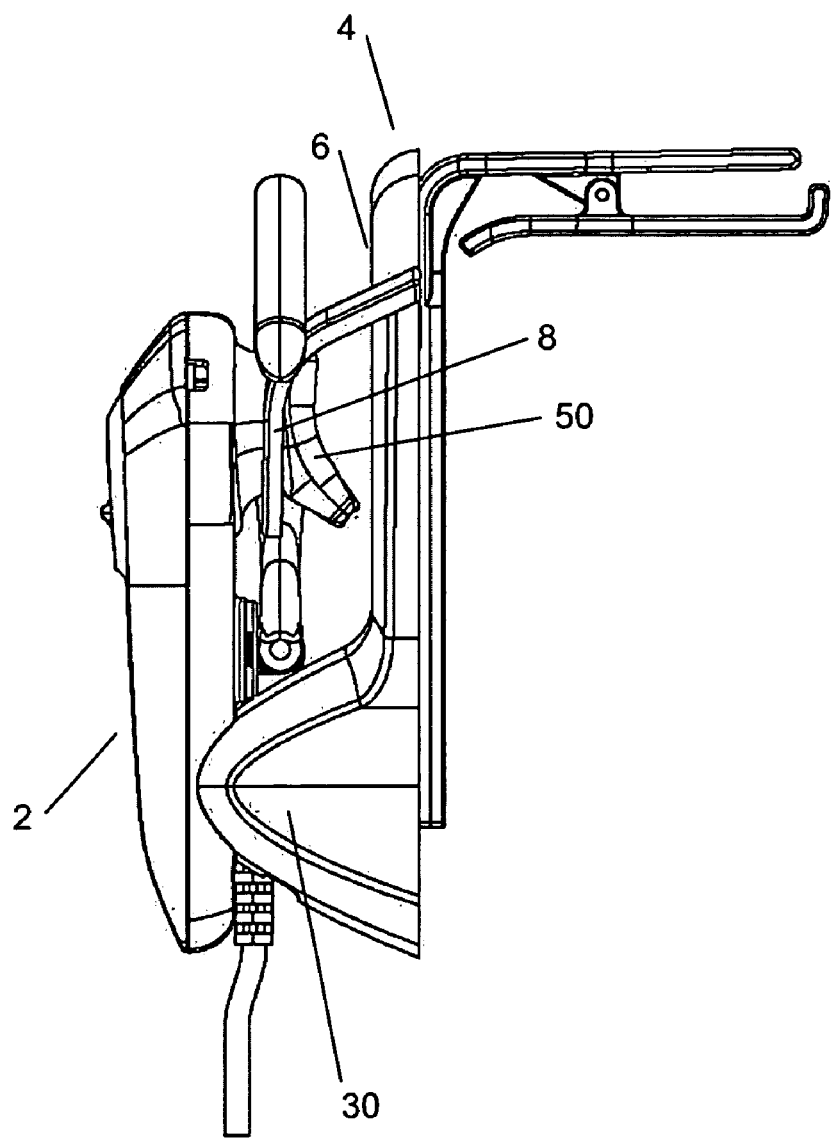
FIG. 6 illustrates a side view of a headset stored in a charging cradle.

A cradle charging interface 12 is disposed in a volume of space between the sidewall 10 and the sidewall 30 for coupling with a headset charging interface. In the example shown in FIGS. 1-3, sidewall 10 and sidewall 30 are part of a housing 44 attached to and extending away from rear wall 6. Referring to FIG. 1, housing 44 includes a planar surface 40 substantially parallel to rear wall 6. The cradle charging interface is disposed within housing 44. Planar surface 40 includes an aperture 46 through which the cradle charging interface is accessed. In a further example, the charging cradle does not utilize a housing 44 and/or sidewall 10 and sidewall 30. Such an example is described below in reference to FIGS. 8-10. Planar surface 40 is at a distance away from rear wall 6 so that an inserted headset is substantially vertical, as shown in FIG. 6.

Referring to FIG. 3, loop 8 extends away from rear wall 6. In the example shown in FIG. 3, a portion of loop 8 is a distance 48 away from rear wall 6. Loop 8 includes a portion 19 coupled to rear wall 6 at an angle between sixty and ninety degrees. Loop 8 includes a portion 21 parallel to rear wall 6 at a distance 48. Distance 48 is greater than the height of a headset earbud to accommodate the inserted earbud. In further examples, the shape of loop 8 may vary. For example, loop 8 may be planar. Referring to FIG. 2, loop 8 has a width 49 sufficient to accommodate the width of a headset earbud. In one example of the invention, the width 49 is selected to tightly grip the headset earbud, which may be composed of a compressible material such as rubber or foam. Following insertion of a headset earbud into loop 8, the headset charging interface is properly positioned over the cradle charging interface.

Without further action, the headset is in a rest status. To detent the headset in a charging mode, the user may push the headset in a direction perpendicular to rear wall 6 in order to engage the cradle charging interface and headset charging operation. The user may insert and detent the headset using a single hand, thereby providing easy docking. A plug and receptacle mating mechanism is used, so the charging cradle does not rely on gravity to maintain the electrical connection between the headset and charging cradle as in the case of wiping contacts. Thus, the charging cradle provides for the convenience of a charging cradle in inserting the headset with one hand while providing for the secure detent of a plug and receptacle mating mechanism. The mating of the headset charging interface and cradle charging interface in one example is described below in reference to FIGS. 11-14. Furthermore, the headset is secured within the cradle by the loop and charging interface coupling so that the headset cannot be dislodged in a jarring environment such as a moving automobile.

In the example shown in FIG. 2, the upper portion 7 is approximately the top half of the length of the planar rear wall 6 and the lower portion 9 is the bottom half of the length of the planar rear wall 6. The placement of loop 8 within the upper portion 7 may vary and the placement of sidewall 10 and sidewall 30 within lower portion 9 may vary. Furthermore, the delineation of lower portion 9 and upper portion 7 may vary.

An advantage of the charging cradle 4 is that it utilizes an "open" design. In particular, the charging cradle 4 may accommodate a variety of headsets with different shapes and sizes. Furthermore, the charging cradle 4 may accommodate a headset with an attached earhook disposed between the earbud and headset charging interface. Referring to FIG. 3, a headset with an earhook may be easily inserted due to an open space 23 between loop 8 and the cradle charging interface. The charging cradle 4 can accommodate headsets of varying boom lengths so long as the distance between the earbud and charging interface on the headset is maintained to match the charging cradle loop 8 and charging interface. The length of the headset above the earbud may also be varied.

Figure 4:
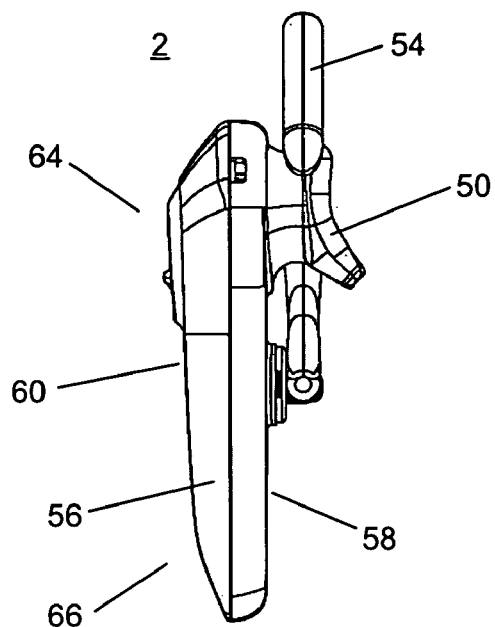
FIG. 4 illustrates a side view of a headset.
Figure 5:
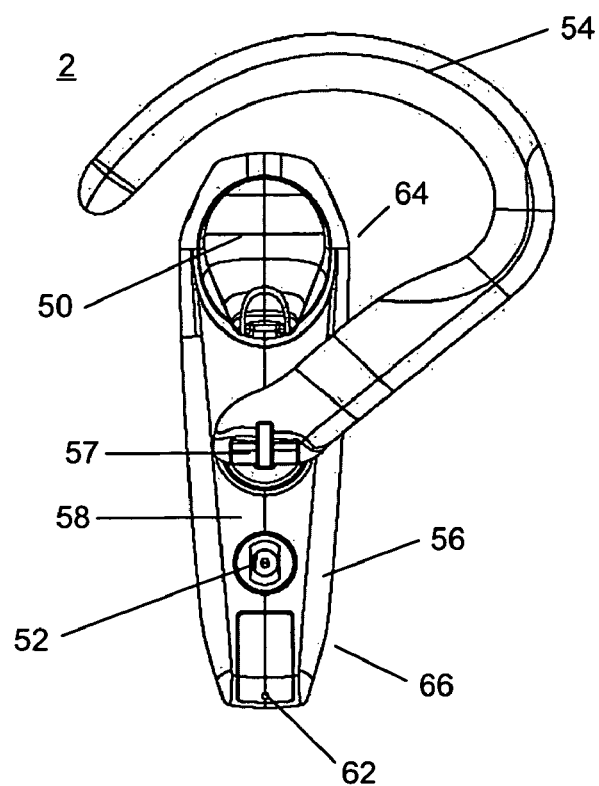
FIG. 5 illustrates a front view of the headset shown in FIG. 4.

Referring to FIGS. 4-6, an example headset 2 is illustrated which may be used with charging cradle 4. The headset 2 design described herein is therefore not intended to be limiting as an advantage of the charging cradle 4 is that it may accommodate headsets of varying size and shape. Referring to FIG. 5, headset 2 includes a headset housing 56 having a first end 64 and a second end 66, a speaker disposed in an earbud 50, a microphone 62, a charging interface 52, and earhook 54. A rechargeable battery is disposed within the headset housing 56 for supplying power to the headset components. The rechargeable battery is electrically connected to the charging interface 52 for receiving charging power. Referring to FIG. 4, the headset housing 56 is an elongated, generally flat hollow casing having an outer side 60 and an inner side 58. In one example, the headset housing 56 is made of plastic or is formed from any number of plastic, metal, metal alloys, or other material known in the art connected to one another or molded from one piece.

Referring to FIG. 5, the first end 64 of the headset housing 56 tapers downward towards the narrower second end 66 at which microphone 62 is disposed to receive voice signals.

While worn, the first end 64 is placed near the user's ear and the second end 66 is nearer the user's mouth. The outer side 60 is positioned away from the user's head and the inner side 58 faces toward the user. The headset 2 is provided with a socket for receiving an earbud 50 which extends from the inner side 58 of the headset housing 56 near the first end 64. In other examples, earbud 50 may be placed at differing locations along the elongated housing 56. Earbud 50 is adapted to rest against the opening of the ear canal.

Charging interface 52 is located on the inner side 58 of the headset housing 56 at the approximate bottom half of the headset housing near the second end 66. The distance between charging interface 52 and earbud 50 is correlated to the distance between loop 8 and the cradle charging interface on the charging cradle. A connector 57 for an earhook 54 is also located on the inner side 58. As shown in FIG. 5, earhook 54 is connected to the headset housing 56 between earbud 50 and charging interface 52. In further examples, connector 57 may be located anywhere along the inner side 58.

Earbud 50 may take one of several different configurations and materials. The earbud 50 comprises a speaker having a soft material extending around or encasing the speaker to allow the speaker to be comfortably inserted into the user's ear. For example, the material encasing the speaker may be a material such as soft rubber, foam, or gel. The material functions to secure earbud 50 within the opening of the auditory canal of the user's ear and is formed to fit snugly and comfortably within the ear opening. The material may therefore be selected so that it slightly compresses during insertion of the earbud and then expands to fit the contour of the user's ear upon release by the user. When inserted into the loop 8 of the charging cradle 4, the material may compress when inserted and expand when released, thereby securing the headset within the charging cradle 4.

The material covering earbud 50 may take a variety of forms. For example, it may be a generally mushroom-like configuration or pill-shaped configuration. The material may be removed so that several different configurations and sizes of material may be interchanged as desired by the user. In further examples, the earbud 50 may have additional mechanisms or appendages for securing the earbud 50 within the ear. For purposes of this disclosure, such mechanisms or appendages are considered part of the earbud 50.

Referring to FIG. 1, the outer side 60 of the headset housing may include an opening for a user interface 68. For example, user interface 68 may be a multifunction power button, answer, and volume control. The outer side 60 may also include an opening 70 for a light-emitting diode used to indicate the headset status.

Figure 11:
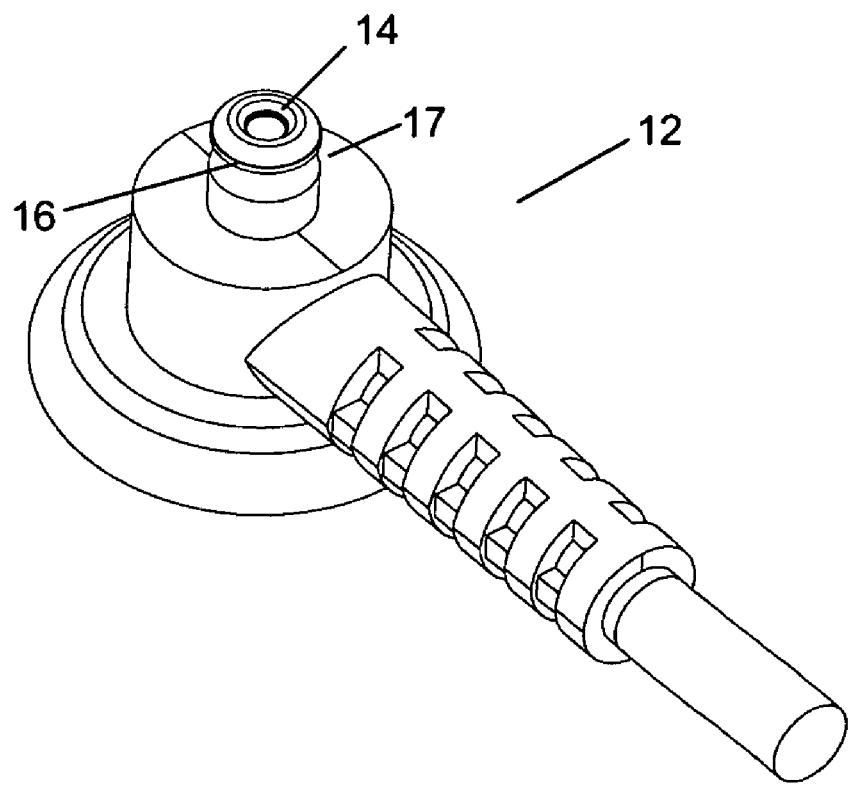
FIG. 11 illustrates a charging cradle interface.
Figure 12:
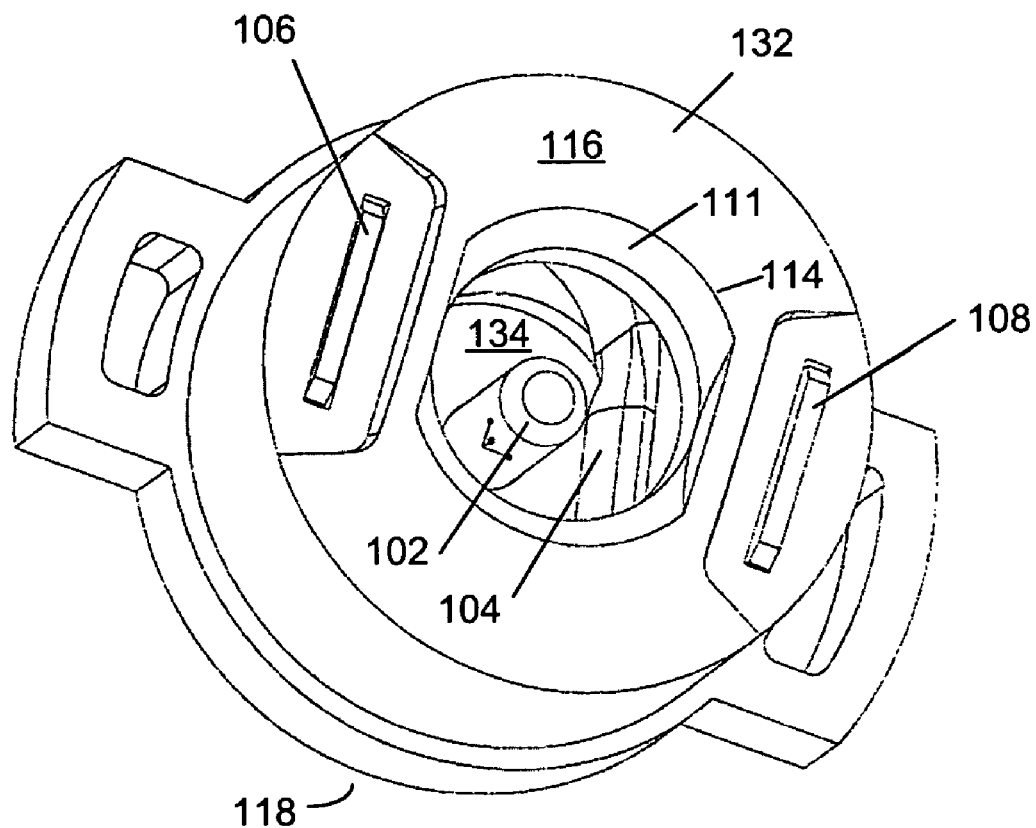
FIG. 12 illustrates a front view of a headset charging interface.

Referring to FIG. 11, a cradle charging interface 12 is illustrated in one example for providing charging current to corresponding charging contacts of a headset 2. Although charging interface 12 offers certain advantages as described herein, in further examples alternative charging interfaces may be used. The cradle charging interface 12 has a cylindrical male plug 17 with interior positive contact 14 and exterior negative contact 16. Interior positive contact 14 includes a female connector. Referring to FIG. 11 and FIG. 12, in one example, interior positive contact 14 has a female connector constructed to receive and mate with a positive contact 102 of a headset charging interface 52. Exterior negative contact 16 has a flanged outer surface constructed to couple with a negative contact 104 of charging interface 52.

Referring to FIG. 3, a side view of a charging cradle 4 and attachment clip 34 is illustrated. Attachment clip 34 is coupled to the charging cradle 4 so that the charging cradle may be conveniently attached, for example, to an automobile interior vent (shown in FIG. 9) or other location. In one example of the invention, charging cradle 4 includes male snap fit connectors 38 on a back surface which couple to corresponding female snap fit connectors 36 on attachment clip 34.

Figure 7:
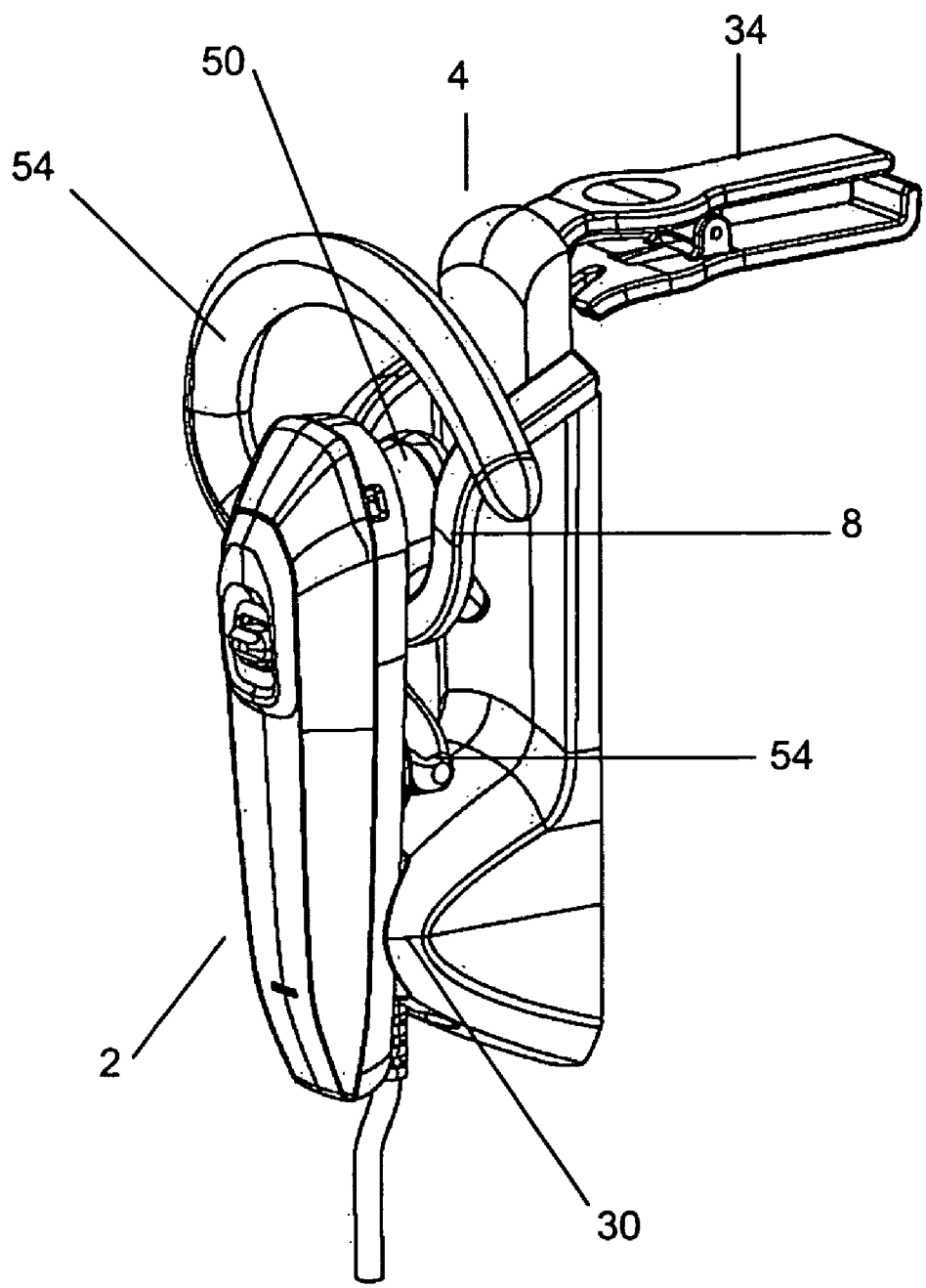
FIG. 7 illustrates a perspective view of a headset stored in a charging cradle.

FIG. 6 and FIG. 7 illustrate a side and perspective view, respectively, of a headset stored in a charging cradle. Earbud 50 rests in loop 8. The headset body is aligned between sidewall 30 and sidewall 10 (not shown). When in a charging mode, the headset body is pushed forward toward the rear wall 6 to engage the headset charging interface with the cradle charging interface in a manner illustrated in FIG. 14.

Figure 8:
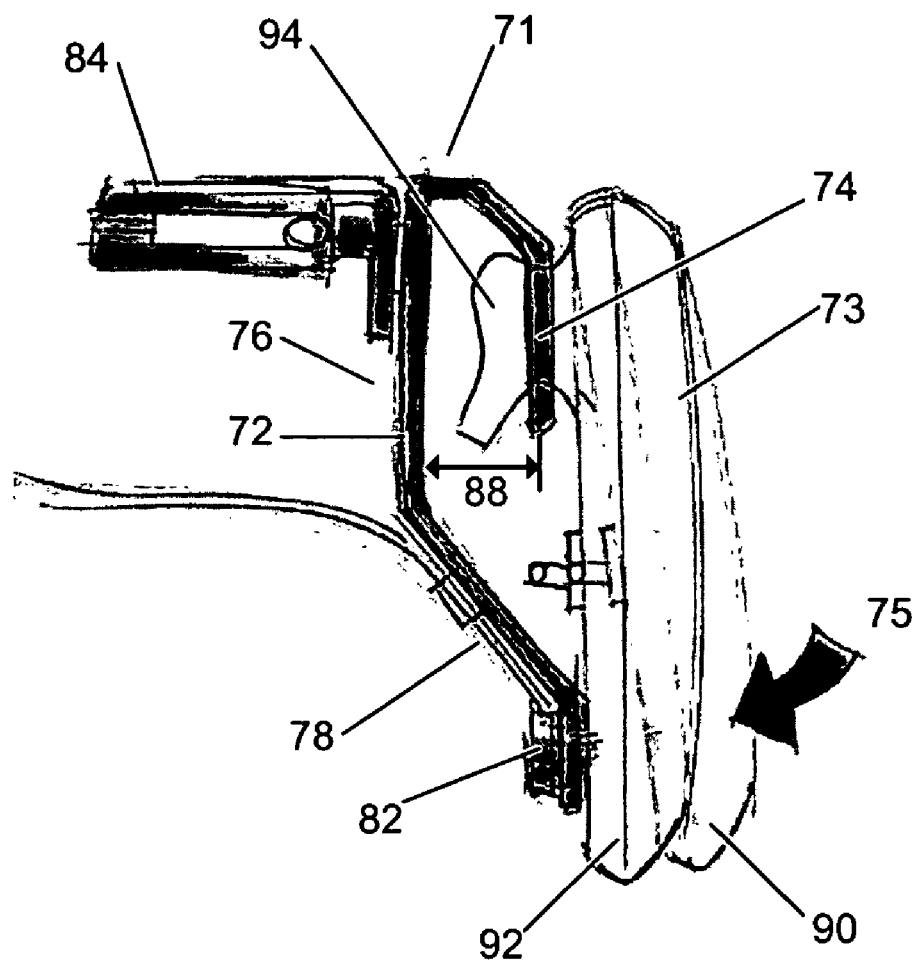
FIG. 8 illustrates a headset stored in a charging cradle in a first position and a second position in a further example of the invention.
Figure 9:
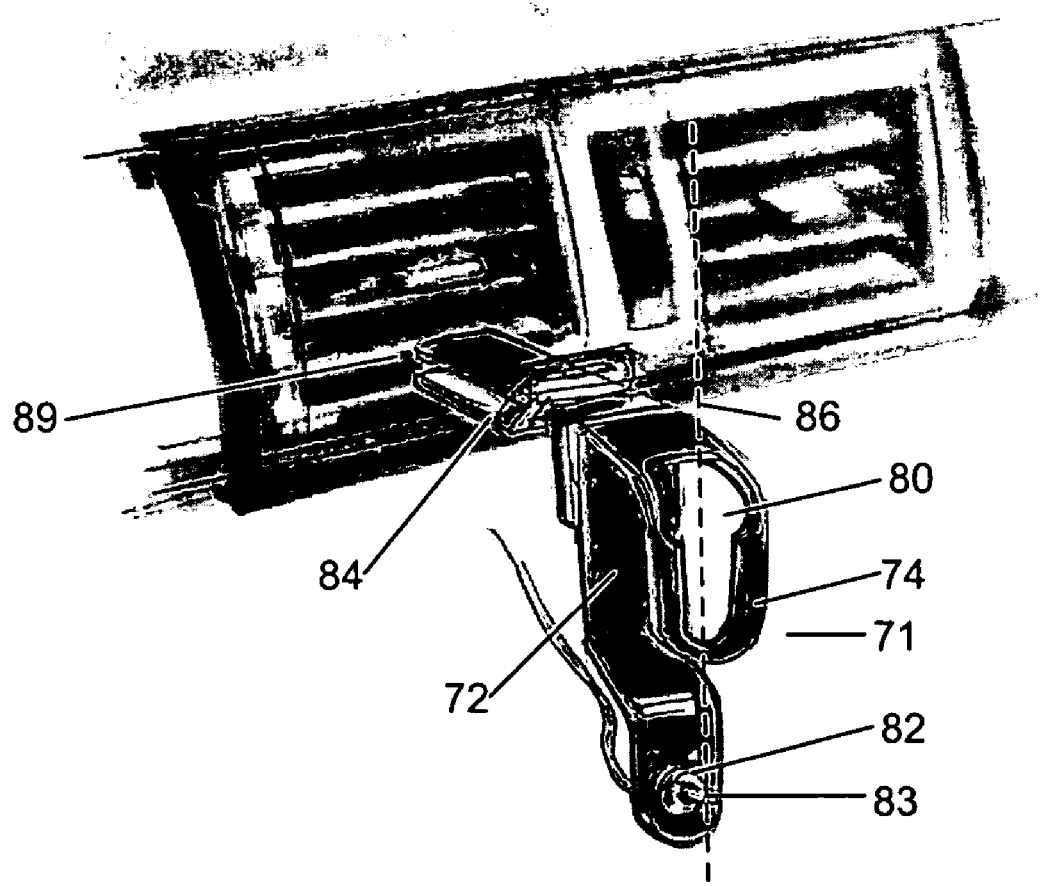
FIG. 9 illustrates a charging cradle coupled to an automobile vent.

Referring to FIG. 8 and FIG. 9, a charging cradle 71 in a further example of the invention is illustrated with a cradle charging interface 82. FIG. 8 illustrates a side view of charging cradle 71 and a headset 73 in a rest position 90 and a charging position 92. The charging cradle 71 preferably includes a planar rear wall 72 having an upper portion 76 and a lower portion 78. A loop 74 is disposed at the upper portion 76 and extends away from the rear wall 72. In operation, loop 74 receives a headset earbud. The charging cradle 71 is coupled to a rotatable attachment clip 84 that may be coupled to, for example, an automobile vent 89.

A cradle charging interface 82 is disposed in the lower portion 78 for coupling with a headset charging interface. The rear wall 72 includes an aperture through which the cradle charging interface is accessed. The rear wall 72 extends outward in the lower portion 78 to align with loop 74 so that an inserted headset 73 is substantially vertical when in the rest position 90 or in the charging position 92.

Referring to FIG. 9, the center of loop 74 and the cradle charging interface 82 are aligned along an axis 86. When inserted into loop 74, the headset 73 is aligned with axis 86 due to gravity or alignment by the user within loop 74. As a result, the headset charging interface is aligned with cradle charging interface 82 at the lower portion 78 of the charging cradle 71. In the example shown in FIG. 8, a portion of loop 74 is a distance 88 away from rear wall 72. Distance 88 is greater than the height of a headset earbud to be inserted into loop 74.

Without further action, the headset is in a rest position 90 upon insertion of the headset earbud into loop 74. In one example, cradle charging interface 82 is a male plug 83 to be inserted into a female receptacle of the headset charging interface. In the rest position 90, the male plug 83 is loosely fit into the headset charging interface. Referring to FIG. 8, to place the headset in a charging position 92, the user may push the headset 73 in a direction 75 substantially perpendicular to rear wall 72 in order to firmly mate the cradle charging interface and headset charging interface. The user may insert and detent the headset using a single hand, thereby providing easy docking. The precise form of the charging cradle 71 may vary in properly positioning the loop 74 above the cradle charging interface as described herein.

Similar to the charging cradle described in the example of FIGS. 1-3, the charging cradle 71 may accommodate a headset with an attached earhook disposed on the headset housing. A headset with an earhook may be easily inserted due to the open design between loop 74 and the cradle charging interface 82. The charging cradle 71 can also accommodate headsets of varying boom lengths and housing shapes as described in the previous example. Furthermore, charging cradle 71 can accommodate headsets of varying widths as no sidewalls are used at the lower portion 78.

Figure 10:
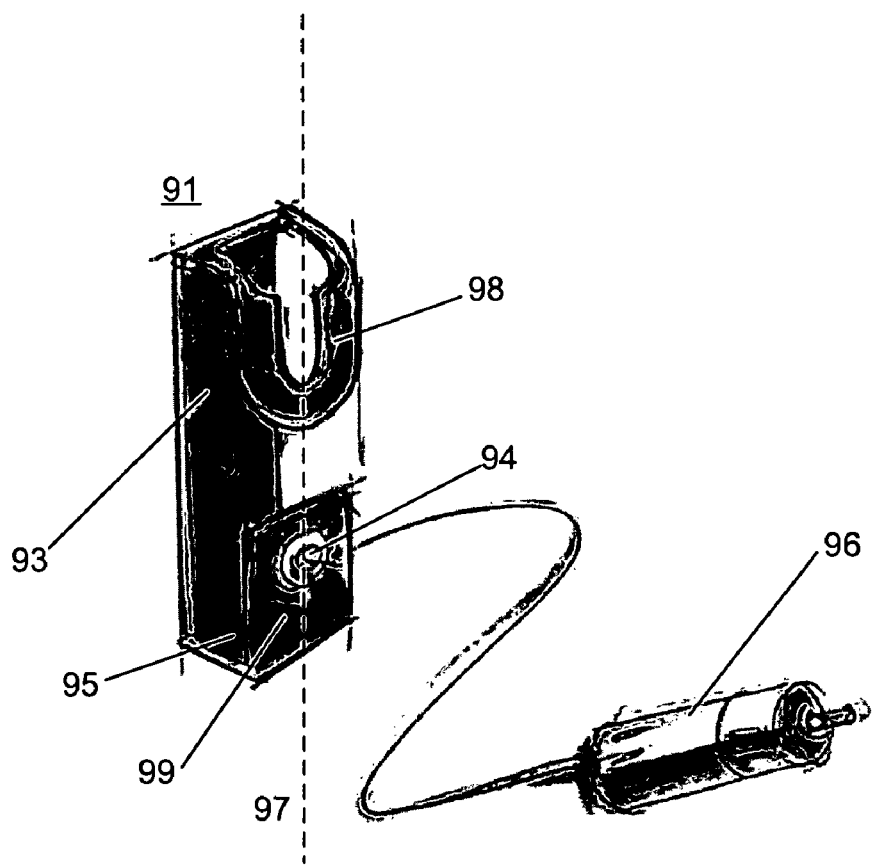
FIG. 10 illustrates a charging cradle in a further example and a cigarette lighter adaptor connector.

FIG. 10 illustrates a charging cradle 91 in a further example of the invention. A cigarette lighter adaptor cable and connector 96 for providing charging power to a cradle charging interface 94 from an automobile cigarette lighter is also illustrated. Charging cradle 91 includes a rear wall 93 having an upper section and a lower section. A loop 98 for receiving a headset earbud is disposed at the upper section and extends away from the rear wall 93. A cradle charging interface 94 is disposed in the lower section for coupling with a headset charging interface. The charging cradle 91 is shaped to extend the charging cradle interface 94 away from rear wall 93 so that it is positioned beneath loop 98. In the example shown in FIG. 10, a planar surface 99 parallel to rear wall 93 is positioned with a base 95. The center of loop 98 and the cradle charging interface 94 are aligned along an axis 97. When inserted into loop 74, the headset is aligned with cradle charging interface 82 at the lower portion 78 of the charging cradle 91.

Figure 13:
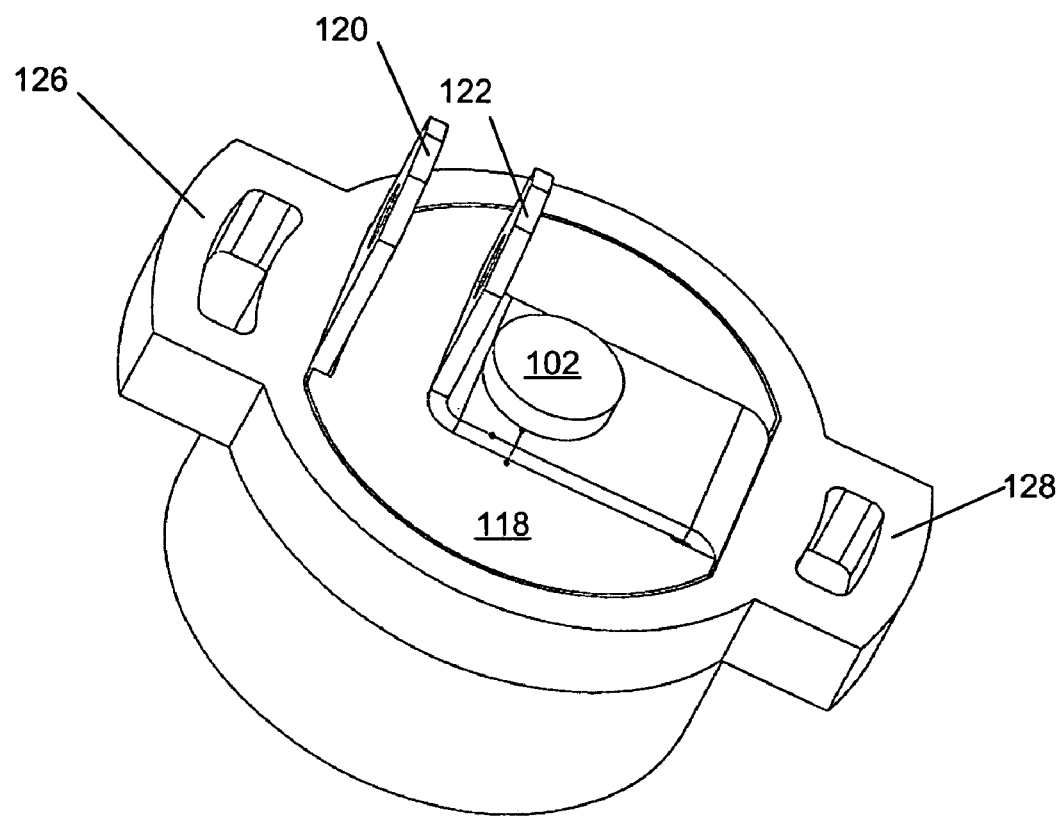
FIG. 13 illustrates a rear view of the headset charging interface shown in FIG. 12.

Referring to FIG. 12 and FIG. 13, a close-up perspective view of a wireless headset charging interface 52 disposed in a headset for mating with cradle charging interface 12 in one example is illustrated. Referring to FIG. 12, a front view illustration of an embodiment of the headset charging interface 52 is shown. The headset charging interface 52 is shown removed from a headset. In use, the front surface of the dual charging interface is aligned with the surface of the headset housing.

The headset charging interface 52 comprises an outer housing 132 having a front surface 116 and a back surface 118. Outer housing 132 is made of a molded polymer, although any suitable material may be used. Front surface 116 contains an aperture 114 opening to a well 134 located within outer housing 132 for accepting a male plug. Front surface 116 further contains a semi-spherical recessed area 111. Two surface charging contacts, negative contact arc 106 and positive contact arc 108 are disposed on front surface 116. The headset charging interface 52 further comprises a negative contact 104 and a positive contact 102 disposed within well 134. Although referred to with different designations herein, in an embodiment of the invention, negative contact 104 and negative contact arc 106 are a single piece construction and electrically parallel. Similarly, positive contact 102 and positive contact arc 108 are a single piece construction and electrically parallel. The negative contact and the positive contact are made of a suitable electrically conductive material such as copper. Contacts designated positive herein can also be designated negative and vice versa.

The headset charging interface 52 is mounted from inside the headset housing and presents an approximately 6.5 mm diameter plastic face with slightly raised metal negative contact arc 106 and positive contact arc 108 arrayed around aperture 114. The module is mounted so that the face is as flush as possible to the base surface of the headset housing. The contact arcs are proud of the surface by about 0.1 mm to 0.2 mm in an embodiment of the invention. In an embodiment of the invention, the contact arcs are concentric shaped. In a further embodiment of the invention, the contact arcs may be linear.

The headset charging interface 52 includes two charging interfaces. The first charging interface comprises a negative contact 104 and positive contact 102 disposed within well 134 behind aperture 114. The second charging interface operates as a female connector for use with a cable having a male charging plug. In an embodiment of the invention, negative contact 104 is a spiral coil contact positioned within well 134 that engages the inserted cable having a male charging plug. Positive contact 102 is a pin structure disposed in the center of well 134 that inserts into a corresponding positive contact receptacle of the male charging plug. For example, positive contact 102 and negative contact 104 mate with the cylindrical male plug 17 of cradle charging interface 12.

The second charging interface utilizes stationary charging contacts comprising negative contact arc 106 and positive contact arc 108 disposed on front surface 116. Negative contact arc 106 and positive contact arc 108 mate with corresponding contacts on a charging base when a headset is inserted into the charging base. The corresponding contacts on the charging base are typically spring loaded, and engage negative contact arc 106 and positive contact arc 108 when the headset is inserted into the charging base. Negative contact arc 106 is coupled to electrical ground. In an embodiment of the invention, the first charging interface further utilizes recessed area 111 and aperture 114 to secure contact between negative contact arc 106 and positive contact arc 108 with corresponding charging contacts on a charging base.

Referring to FIG. 13 showing the backside of headset charging interface 52, the bottom surface of positive contact 102 is shown. Outer housing 132 includes a back surface 118. A negative terminal 120 and positive terminal 122 are utilized to provide charging current to a rechargeable battery located at the headset. In an embodiment of the invention, negative contact 104, negative contact arc 106, and negative terminal 120 are a single piece construction. Similarly, positive contact 102, positive contact arc 108, and positive terminal 122 are a single piece construction. The battery is a rechargeable battery, such as a lithium ion battery, which is electrically coupled to negative terminal 120 and positive terminal 122. The electrically parallel first charging interface and second charging interface provide an efficient and space saving arrangement to provide charging power to the rechargeable battery. In an alternate embodiment, although electrically coupled, negative contact 104, negative contact arc 106, and negative terminal 120 are not a single piece construction. Similarly, in an alternate embodiment, positive contact 102, positive contact arc 108, and positive terminal 122 are not a single piece construction. Positive contact 102 extends through positive terminal 122 and back surface 118 into well 134.

As a result, charging current is provided to a battery at the headset coupled to negative terminal 120 and positive terminal 122 regardless of which charging interface is utilized. Outer housing 132 further includes headset mounting handles 126 and 128 for mounting the headset charging interface 52. The headset charging interface 52 may be manufactured as a stand-alone module, and has the packaging flexibility allowing for either board or cable mounting.

In operation, the user places the headset earbud into loop 8 and the headset is aligned over the cradle charging interface. To mate the cradle charging interface and the headset charging interface, the user presses on the lower portion of the headset body over the charging interface towards the cradle. Upon pressing, the charging cradle cylindrical male plug 17 is inserted through the headset electrical interface aperture 114 into well 134. Positive contact 102 of headset charging interface 52 fits into the female connector of charging cradle interior positive contact 14 to form an electrical interconnection. During insertion of male plug 17, negative contact 104 of headset charging interface 52 extends in an outward radial direction due to force from the charging cradle male plug 17. Simultaneously, positive contact 102 enters interior positive contact 14.

Figure 14:
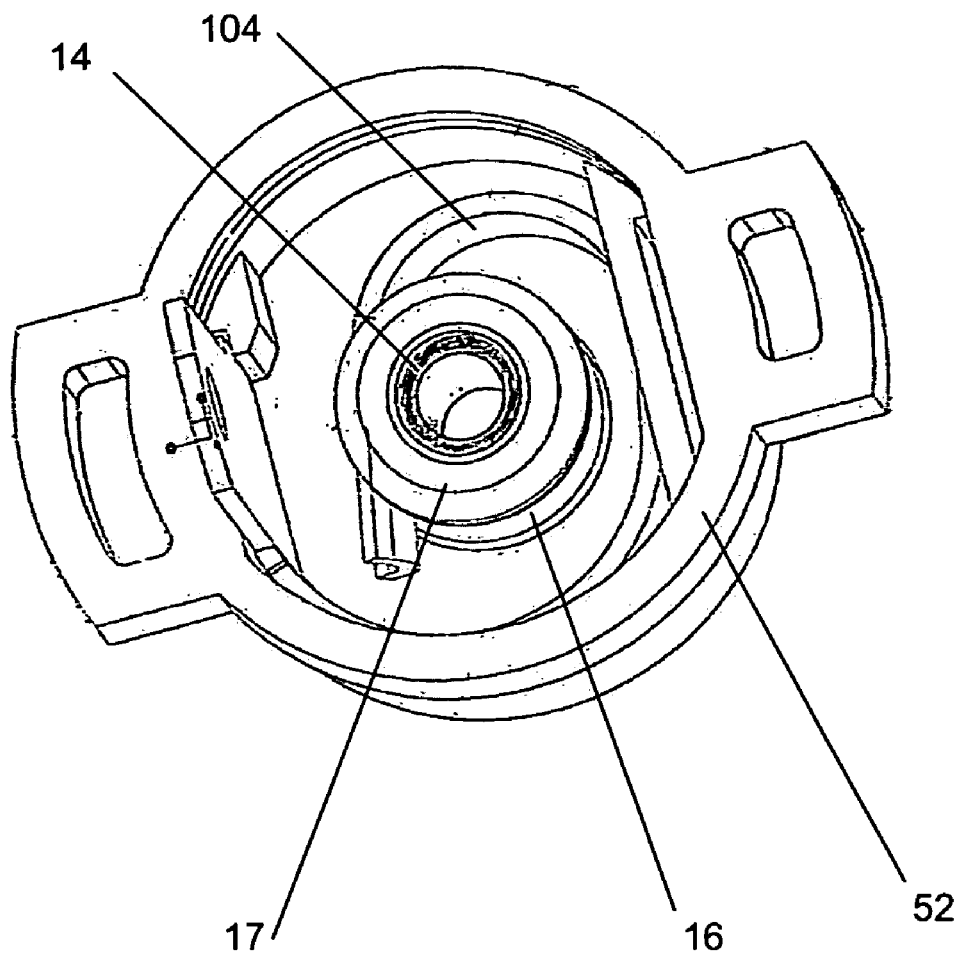
FIG. 14 illustrates coupling of a headset charging interface with a charging cradle interface.

As the insertion process of male plug 17 continues, the force on negative contact 104 by exterior negative contact 16 recedes as the flanged outer surface of negative contact 16 becomes parallel with negative contact 104, resulting in negative contact 104 retracting into a groove in the outer surface of negative contact 16 in a detent position. Simultaneously, positive contact 102 continues to be inserted into interior positive contact 14 until full insertion is reached, corresponding to the locked (also referred to herein as "detent") position of negative contact 16. The radial force applied by male plug 17 against negative contact 104 results in sideways movement of negative contact 104 until positive contact 14 engages positive contact 102 and maintains contact. Referring to FIG. 14, back surface 118 shown in FIG. 13 has been removed and negative contact 104 of headset charging interface 52 is shown mated in a detent position with exterior negative contact 16 of male plug 17 after mating of headset charging interface 52 with cradle charging interface 12. For clarity, positive contact 102 is not illustrated in FIG. 14.

Loop 8 provides the necessary alignment to mate headset charging interface 52 together with cradle charging interface 12 upon insertion of the earbud into loop 8 and headset between sidewall 10 and 30. In addition to providing electrical coupling, charging interface 12 physically locks the headset within the charging cradle, allowing the headset to be displayed in a convenient, secure, and visually elegant manner without the possibility of the headset being dislodged out of the charging cradle or the charging current disrupted. The charging cradle allows easy insertion and locking with one hand.

To remove the headset 2 from charging cradle 4, the lower end is first pulled in a direction away from the charging cradle. As the headset 2 is pulled, negative contact 104 of headset charging interface 52 extends in an outward radial direction due to force from male plug 17, thereby allowing charging interface 52 to be raised and uncoupled from cradle charging interface 12. Simultaneously, positive contact 102 is withdrawn out from charging cradle interior positive contact 14. Once the headset charging interface 52 and cradle charging interface 12 are uncoupled, the earbud 50 is lifted from the loop 8 to complete the removal.

Although reference is made throughout the specification to a headset charging cradle and headset, the present invention could be employed in any device having contacts which couple with contacts of a removable device. Although reference is made throughout the specification to utilizing the contacts for charging, other purposes such as the transfer of data or any other purpose requiring coupling of devices. Furthermore, although in the preferred embodiment the charging cradle is used with a headset with an earhook, in other embodiments other types of headsets may be utilized.

The various examples described above are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. Such changes may include, but are not necessarily limited to the shape of the loop. Such modifications and changes do not depart from the true spirit and scope of the present invention that is set forth in the following claims.

Thus, the scope of the invention is intended to be defined only in terms of the following claims as may be amended, with each claim being expressly incorporated into this Description of Specific Embodiments as an embodiment of the invention.

What is claimed is:

1. A charging cradle comprising:
    a rear wall having an upper portion and a lower portion;
    a loop disposed at the upper portion extending away from the rear wall for receiving a headset earbud;
    a first sidewall and a second sidewall at the lower portion extending away from the rear wall for receiving a headset body; and
    a cradle charging interface disposed between the first sidewall and the second sidewall for coupling with a headset charging interface.

2. The charging cradle of claim 1, wherein the cradle charging interface comprises a male plug with an interior contact and an exterior contact.

3. The charging cradle of claim 2, wherein the interior contact comprises a female connector for receiving a male connector and the exterior contact comprises a flanged ring for mating with a spring coil.

4. The charging cradle of claim 3, wherein the headset charging interface comprises a housing with a front surface, wherein the front surface includes an aperture leading to a well within the housing, and wherein a first positive contact comprising a spring coil is disposed within the well and a first negative contact comprising a pin structure is disposed within the well.

5. The charging cradle of claim 1, further comprising a car vent clip attachable to a back surface of the rear wall.

6. The charging cradle of claim 1, further comprising a planar detent surface between the first sidewall and the second sidewall substantially parallel to the rear wall.

7. The charging cradle of claim 6, wherein the planar detent surface and a portion of the loop are aligned at a distance from the rear wall.

8. The charging cradle of claim 1, further comprising a cable having a first end and a second end for delivering charging power to a stored headset, wherein the cradle charging interface is disposed at the first end and a cigarette lighter adapter connector is disposed at the second end.

9. The charging cradle of claim 1, wherein the loop and the cradle charging interface are aligned along an axis.

10. A charging cradle comprising:
    an upper portion having a loop extending away from a rear wall; and
    a lower portion having a cradle charging interface disposed outside an open receptacle between the loop and the rear wall, wherein the lower portion is shaped to extend the cradle charging interface to a position below the loop.

11. The charging cradle of claim 10, wherein the cradle charging interface comprises a male plug with an interior contact and an exterior contact.

12. The charging cradle of claim 11, wherein the interior contact comprises a female connector for receiving a male connector and the exterior contact comprises a flanged ring for mating with a spring coil.

13. The charging cradle of claim 12, wherein the headset charging interface comprises a housing with a front surface, wherein the front surface includes an aperture leading to a well within the housing, and wherein a first positive contact comprising a spring coil is disposed within the well and a first negative contact comprising a pin structure is disposed within the well.

14. The charging cradle of claim 10, further comprising an automobile vent clip attachable to a back surface of the rear wall.

15. The charging cradle of claim 10, wherein the loop and the cradle charging interface are aligned along an axis.

16. A charging cradle comprising:
a loop means for receiving a headset earbud; and
a cradle charging interface means disposed outside the loop means for coupling with a headset charging interface, wherein the loop means is aligned along an axis with the cradle charging interface means.

17. The charging cradle of claim 16, further comprising an attachment means for attaching the charging cradle to an automobile vent.

18. The charging cradle of claim 16, further comprising a cable means for coupling the cradle charging interface means to a power supply.

19. The charging cradle of claim 16, wherein the cradle charging interface means comprises a male connector means for coupling with an associated headset female connector means.

20. The charging cradle of claim 16, further comprising a means for aligning the loop means and cradle charging interface means so that an inserted headset is substantially vertical.

\* \* \* \* \*